(12) United States Patent
Montgomery et al.

(10) Patent No.: US 11,915,180 B2
(45) Date of Patent: Feb. 27, 2024

(54) SYSTEMS AND METHODS FOR IDENTIFYING AN OFFICER AT RISK OF AN ADVERSE EVENT

(71) Applicant: Benchmark Solutions, LLC, Chicago, IL (US)

(72) Inventors: Nicholas Montgomery, Chicago, IL (US); Ron Huberman, Chicago, IL (US)

(73) Assignee: Benchmark Solutions, LLC, Chicago, IL (US)

( * ) Notice: Subject to any disclaimer, the term of this patent is extended or adjusted under 35 U.S.C. 154(b) by 0 days.

(21) Appl. No.: 17/132,458

(22) Filed: Dec. 23, 2020

(65) Prior Publication Data

US 2021/0216927 A1   Jul. 15, 2021

Related U.S. Application Data

(60) Provisional application No. 62/955,812, filed on Dec. 31, 2019.

(51) Int. Cl.
*G06Q 10/02* (2012.01)
*G06Q 10/0635* (2023.01)
*G06N 20/00* (2019.01)
*G06Q 10/0631* (2023.01)
*G06Q 10/0639* (2023.01)
*G06Q 50/26* (2012.01)

(52) U.S. Cl.
CPC ......... *G06Q 10/0635* (2013.01); *G06N 20/00* (2019.01); *G06Q 10/06398* (2013.01); *G06Q 10/063114* (2013.01); *G06Q 50/26* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 11,010,702 B1* | 5/2021 | Shah ................. | G06Q 10/0635 |
| 2004/0128187 A1* | 7/2004 | Neuberger ......... | G06Q 30/0201 |
| | | | 705/7.29 |
| 2017/0236081 A1* | 8/2017 | Grady Smith ..... | G06Q 10/0637 |
| | | | 705/7.36 |
| 2018/0046926 A1* | 2/2018 | Achin .................... | G06N 20/20 |
| 2019/0244152 A1* | 8/2019 | Yan .................. | G06Q 10/06398 |
| 2019/0342452 A1 | 11/2019 | Strong et al. | |

OTHER PUBLICATIONS

European Search Report EP 20 21 7745 dated Apr. 23, 2021.

* cited by examiner

*Primary Examiner* — Arif Ullah
(74) *Attorney, Agent, or Firm* — Prospect Law LLP

(57) ABSTRACT

A computer-implemented method for determining a risk score reflecting the risk that a police officer may be involved in an adverse event in the future having a computer system preprocessing data to create residual features; the computer system iteratively running models using the collected data and residual features; the computer system identifying the model that best predicts whether a police officer may be involved in an adverse event in the future; and, the computer system generating a risk score by running the model.

15 Claims, 8 Drawing Sheets

SYSTEMS AND METHODS FOR IDENTIFYING AN OFFICER AT RISK OF AN ADVERSE EVENT

FIELD OF THE INVENTION

This invention relates generally to an early intervention system, and in particular to a system and method for identifying a police officer who may be at risk for involvement in an adverse event.

BACKGROUND OF THE INVENTION

For many years, certain police officers have been involved with adverse events, such as citizen complaints or excessive uses of force. Early intervention systems ("EIS") have been used to detect officers exhibiting alarming behavioral patterns in order to bring attention to individuals so that intervention, such as counseling or training, before serious problems arise and are regarded as risk-management tools for countering this issue.

Early EISs are "threshold-based." They attempt to identify officers at risk of adverse events by observing a number of performance indicators and raising a flag when certain selection criteria are met, i.e., a "threshold." In other words, these systems provide a breakdown of who may and may not be at risk of an adverse event, without further inquiry into degree or appropriateness of the assessment. These thresholds are usually counts of certain kinds of incidents over a specified time frame, such as, for example, two accidents within 180 days or three uses of force within 90 days. Thresholds such as these fail to capture the complex nature of behavioral patterns and the context in which these events play out. For example, one known system uses the same thresholds for officers working the midnight shift in a high-crime area as an officer working in the business district in the morning.

More sophisticated "threshold-based" systems flag outliers while conditioning on one or two variables, such as the officer's territory, but still fail to include many factors. For example, one known system's indicators include complaints, uses of force, vehicle pursuits and accidents, rule-of-conduct violations, raids and searches of civilians or civilian property and officer injuries. But important factors, such as prior suspensions from the force, are often not included.

Threshold-based EIS's still have shortcomings. For example, threshold-based EIS's are easily gamed by officers because the thresholds are visible and intuitive. Also, output from threshold-based EIS's is limited to binary flags, e.g., at risk or not at risk, and not any type of risk score.

A more recent EIS system is based on machine learning. Such a system alleviates some of the above issues and can be "retrained" based on new data. These systems only look at features based on aggregate activity, i.e., a sum of events or characteristics. These systems can also generate "risk scores" which not only identify officers that are at risk, but can also identify officers that are doing well. However, known machine learning systems also have shortcomings. They simply use aggregate activity to compare an individual's performance to an overall sum of events. These EIS's lack context, do not control for an officer's performance relative to the performance of that officer's peers, are limited in their extensibility to add additional features and controls to the process, and require starting from scratch when applying the systems to multiple clients.

There is a need for an improved early intervention system that overcomes the shortcomings of the prior systems.

SUMMARY

These and other needs are addressed by the present invention, in which data or information is preprocessed to build or develop features or variables that can be analyzed and used to create and identify a model using machine-learning. Preprocessing the data normalizes and restructures the data and allows a machine-learning engine to better identify the features that are important when modeling the data to create a risk score to predict the risk of an adverse event.

The preprocessing may occur at one level or layer or at more than one level or layer in order to generate features or variables for the model to use in its analysis. In contrast with other techniques, the features are preprocessed and the model uses the preprocessed features to do its analysis.

The present invention stems from the realization that in the context of identifying officers at risk of an adverse event, there is a need to look beyond simple patterns of problematic behavior and officer history, and instead allow for complex modeling that can be applied or re-applied across multiple customers/agencies as well as comparing an officer's performance and characteristics to those of the officer's peers in order to identify whether an officer may be at risk of an adverse event. First-order residuals or features can be created by preprocessing data that has been collected. The first-order residuals are used by a machine-learning engine to identify a model that can be used to generate a risk score.

The present invention also stems from the realization that that first-order residuals can also be used as additional inputs into the broader risk prediction system. This is done by subsequent preprocessing steps to create second-order residuals, using first-order residuals, that can also be used by a machine-learning engine to identify a model that can be used to generate a risk score. Other features and residuals described herein can be used as well.

It is also discovered that using a model to predict the risk of an adverse event that uses these features or variables that control for activity of an officer by comparing their activity to that of their peer group is a better predictor of risk.

The risk score generated by the model can be revised based on other factors such as policy flags, whether certain training or interventions have taken place and whether an abnormal pattern of behavior has been detected. These factors, and others, can be used to reduce or boost a risk score.

The present system takes into account total productivity relative to signs that an officer may be engaging in problematic behavior. The system also notifies a user at the first sign of a need to intervene and can help get an off-track officer back on track. The system does not need to be constantly queried and analyzes cumulative data on an ongoing basis. The system can also learn over time which improves accuracy given evolving and greater amounts of data.

The present system can also display information relating to an officer's risk score, such as an individual's risk score, the risk benchmark and any revisions that were made to the modeled risk score. Information displayed may be linked to other information that can be displayed by clicking on it. For example, linked information may include an individual officer's features, the benchmark or average features and the typology or latent class of the officer.

Accordingly, one aspect of the invention relates to a method and software for preprocessing data to create features, using machine-learning to generate and identify a model based on the features, then, using the identified model, generate a risk score for an officer, revising the risk score based on other factors and displaying information relating to the officer's risk score. Recommendations can be made based on the risk score which, if implemented, may have the effect of reducing the risk, or even preventing an adverse event from occurring.

Other advantages of the present invention will become readily apparent from the following detailed description. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The foregoing aspects and many of the attendant advantages of the disclosed embodiments will become more readily appreciated by reference to the following detailed description, when taken in conjunction with the accompanying drawings, wherein:

FIGS. 7-1 and 7-2 illustrate screen shots showing information relating to a risk score that can be displayed.

DETAILED DESCRIPTION

A methodology for identifying police officers who may be at high risk for involvement in an adverse event is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The system disclosed herein can be used to predict officers at risk of involvement in adverse events with both high accuracy and high interpretability. Generally, the system precalculates absolute aggregates and aggregates relative to peer and other data-based groupings from officer event and reported data systems. The system combines precalculated data over multiple time and data time points and selects patterns using a machine learning model. The system also provides a display that combines a series of unique preprocessing components and models, a machine learning engine, and post processing for visualization.

Figure 1:
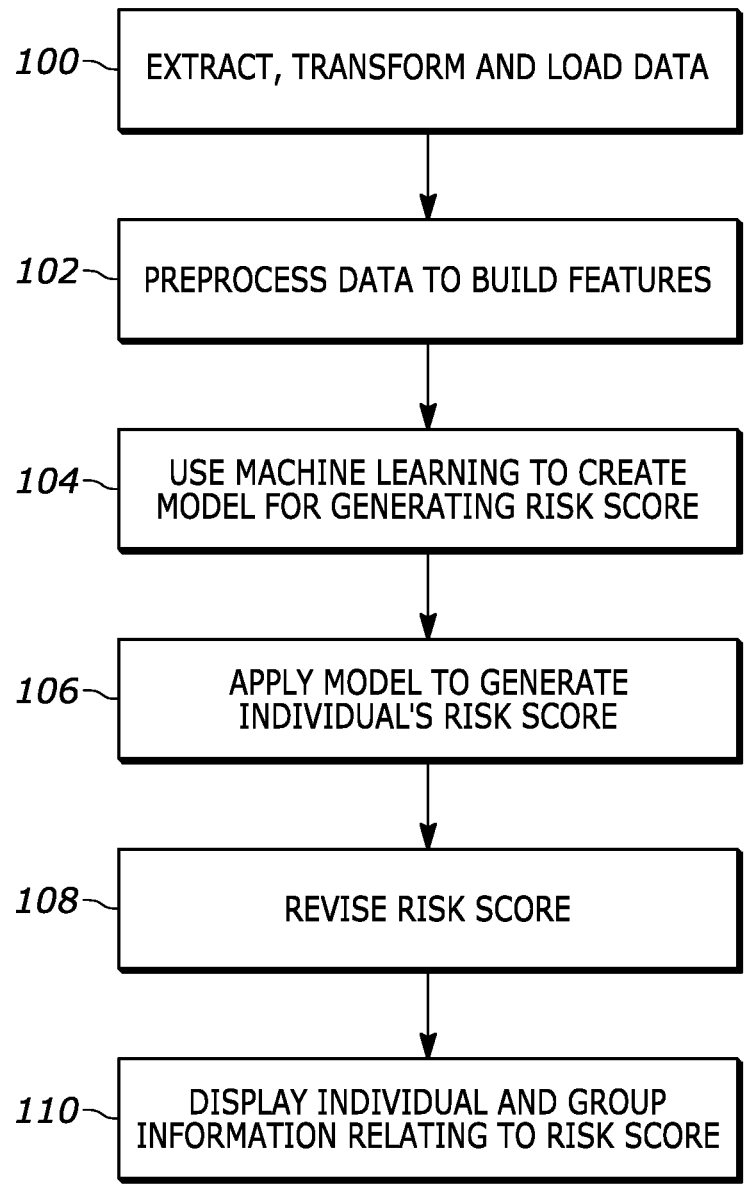
FIG. 1 is a flow diagram illustrating the general operation of one embodiment of the present invention.

FIG. 1 is a flow diagram illustrating the general operation of one embodiment of the present invention. A more detailed description of the process follows in the context of FIGS. 3-6 below.

As shown in FIG. 1, as first step 100, data concerning employee (e.g., police officer) information and events is extracted from various sources in which it has been collected. It may also be transformed and loaded into a database that can be used by a computer system. The data may relate to certain characteristics and events and can be used as features that can be used to determine a model and risk score for an officer. As a second step 102, features or variable are built or created that can be used to create a model for generating a risk score for an officer. The new features may be built or created, in part, by preprocessing certain data collected by the extraction module. As a third step 104, a model for analyzing performance based on the features or variables is generated. In a fourth step 106, the model is applied to the data to determine an initial risk score for an officer. In a fifth step 108, the officer's initial risk score is revised based on various different parameters that lie outside the model. The risk score may be revised up or down based on certain flags or information. As a sixth step 110, various information can be displayed relating to an officer's risk score as well as group information.

Data Extraction

Figure 2:
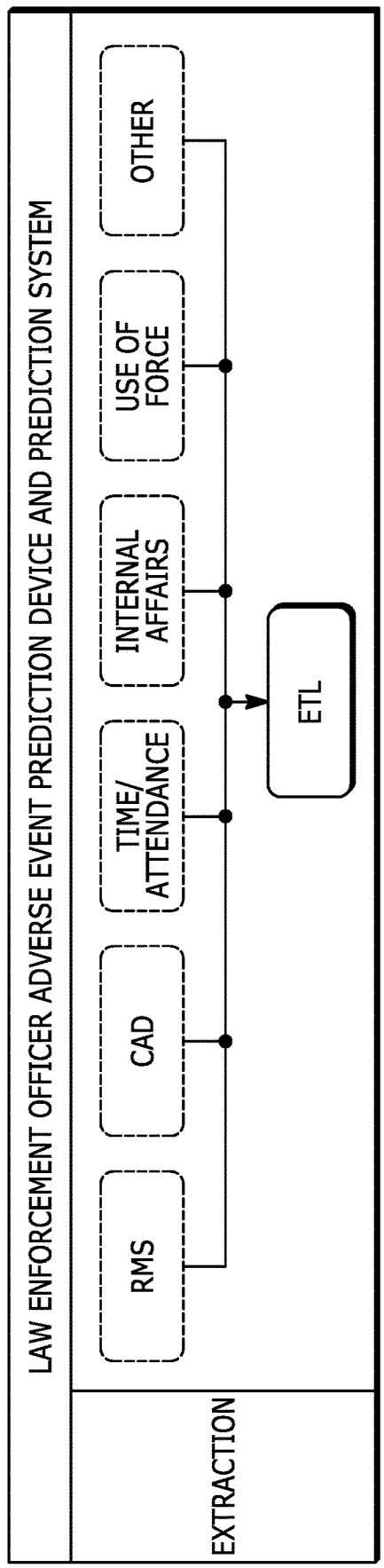
FIG. 2 is a flowchart for implementing an exemplary method for data extraction.

FIG. 2. illustrates various different types of data concerning employee records and events that can be extracted, transformed and loaded into a database that can be used by an early intervention system. The data may relate to certain characteristics and events and can be used as features that can be used to determine a model and risk score for an officer. For example, information may be extracted from records in records management systems ("RMS"), computer aided dispatch systems ("CAD"), time/attendance systems, internal affairs systems, use of force and other records.

Some of the data or information may be demographic information about the officer, e.g., education level, years of service, race, height and weight. Other data or information may relate to dispatch event information (e.g., type of event, and time and location of event), criminal complaints by citizens, citations written by officers, traffic stops by officers, arrests by officers, filed interviews by officers, secondary employment by officers, training, existing flags and general neighborhood data.

Some of the data or information collected may be considered "outcome" data. For example, information about adverse events, such as a complaint filed against the officer, when an officer uses of force, engages in a vehicle pursuit, gets into a vehicle accident, commits a rule-of-conduct violation, is injured or conducts a raid and search, can be outcome data. The data may also include the results or rulings of complaints, whether some events were justified or not, or whether some events were preventable or not. Data or information from one event may be linked to other data or information or other records in the database. Other data or information may be collected as well. Also, because the data may come from various sources and various formats, it may need to be transformed into a form or format that can be used by the early intervention system.

Preprocessing/Feature Building

A key feature of the present invention stems from the realization that the data can be preprocessed, i.e., processed before modeling the data, to create new features that improve the signal on relevant officer activity and to provide information as to the best features or variables should be input into a model to generate a risk score for identifying a police officer who may be at high risk for involvement in an adverse event. Use of preprocessed features allow the system to understand how an officer's performance compares to others around him. It allows the system to understand the extent to which the activity of individual officer is typical or greater or less than typical.

Figure 3:
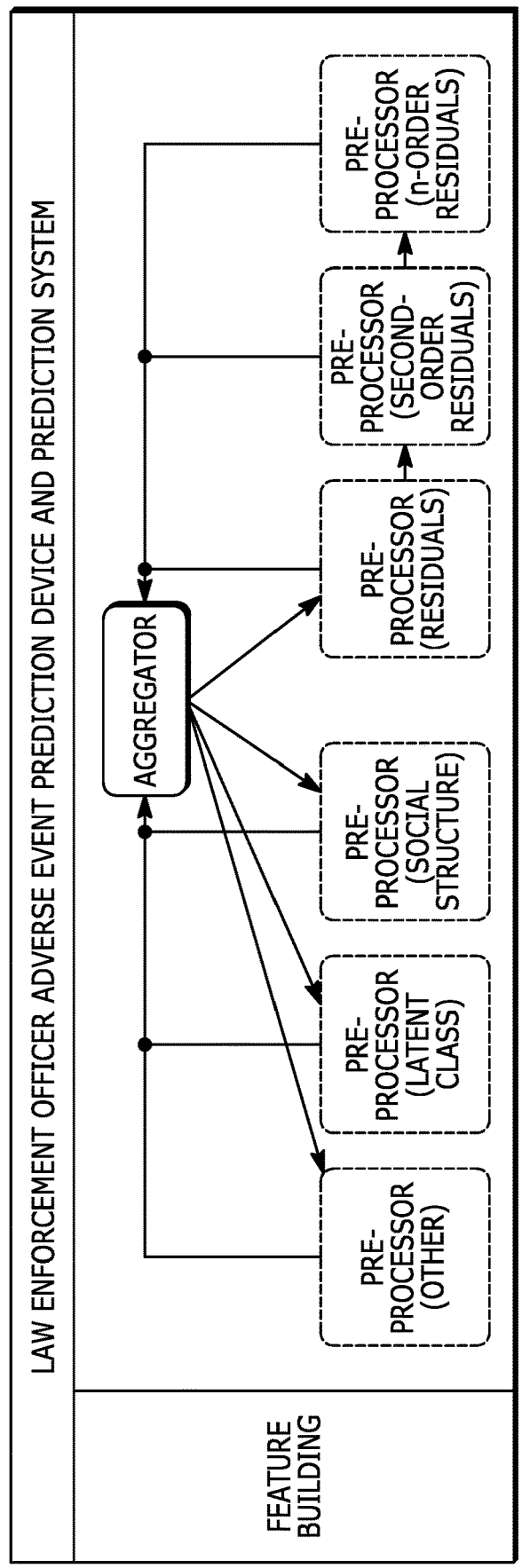
FIG. 3 is a flowchart for implementing an exemplary method for preprocessing data that has been extracted.

FIG. 3 is a flow diagram illustrating various features that can be built by preprocessing the data that has been collected and stored in the database. For example, an aggregator module may preprocess the data to build or determine various features which reflect a peer group analysis with respect to certain events. Features that can be built include, first-order residuals, second-order residuals, n-order residuals, latent class residuals and social structure residuals.

Officer activity can be divided into variables or features that establish baseline productivity of an officer. Variables or features that can establish such officer baselines may include the number of arrests, the number of traffic stops and the number of dispatches. The results of that productivity can also be established and may include the number of uses of force and number of vehicle pursuits. Other variables and results can be used or established as well.

The aggregator module can apply one or more statistical models to the data to determine a "residual" which reflects the officer's performance compared to a peer group, and therefore can indicate whether a particular officer's productivity or results are more or less than that officer's peers. An officer's residual for a particular event may reflect that an officer is over-performing or under-performing compared to their peer group.

Examples of preprocessed features are set forth below:

a. First-Order Residuals

As an example, to understand the overall productivity of an officer and how this productivity compares to an officer's peers, the system may focus on the number of arrests within one year. After calculating the raw number of arrests for every officer, the system can run a model (such as a linear regression model) to understand whether an officer's number of arrests is high or low relative to peers using the following formula:

$$Y = \beta_0 + \mathbb{V}_{unit} + \mathbb{V}_{geo} + \mathbb{V}_{time} + \varepsilon$$

Where:

Y=the number of arrests that have occurred in the last 365 days for an officer $\beta_0$=the average number of arrests for the department $\mathbb{V}_{unit} = $ $\sum_{unit_i=0}^{u} \beta_{unit_i} * Unit_i = $ A vector of coefficients that represent the units officers work in and whether an individual officer works in the unit (the coefficient is the difference between that unit's number of arrests and the average, holding all else constant)

$\mathbb{V}_{geo} = \sum_{geo_i=0}^{g} \beta_{geo_i} * Geo_i = $ A vector of coefficients that represent the geographies officers are deployed to and whether an officer works in that individual geography(the coefficient is the difference between that geography's number of arrests and the average, holding all else constant)

$\mathbb{V}_{time} = $ $\sum_{time_i=0}^{t} \beta_{time_i} * Time_i = $ A vector of coefficients that represent the time-periods during the day when an the officer is deployed and whether an individual officer works in that time period(the coefficient is the difference between that time-period's number of arrests and the average, holding all else constant)

$\varepsilon$=the officer's residual=The number of arrests that the officer has more or less than the average, holding all other variables constant In this example, ultimately, £ is the value/feature the system is seeking to determine.

Depending on the distribution of the underlying data for an event, the system may run a different statistical model to determine a particular residual feature.

For example, for normally distributed data, a standard linear regression may be used. For data which are 'count' data (i.e., have the plurality of observations at 0 or 1) with a long tail (e.g., use of force), a non-linear regression, such as a Poisson regression may be used. In both cases, the function has standard and well-known variations and the outputs are essentially the same.

b. Second-Order Residuals

Another key feature of the present invention stems from the realization that first-order residuals can also be used as input into other models or as inputs into the broader risk prediction system. This is done by subsequent preprocessing steps to determine second-order residuals.

In a next layer of preprocessing a second-order residual can be determined. To determine a second-order residual, a first-order residual (shown above) is taken, but then includes another aggregate feature as an independent variable. As an example, to understand whether an officer uses more force relative to peers and relative to their number of arrests, the system could add the aggregate number of arrests to the model as follows:

$$Y = \beta_0 + \mathbb{V}_{unit} + \mathbb{V}_{geo} + \mathbb{V}_{time} + \beta_{arrests} * Arrests + \varepsilon$$

Where:

Y=the number of uses of force for an officer $\beta_0$=the average number of uses of force for the department $\beta_{arrests}$=the average amount that each arrest increases use of force, holding all else constant Arrests=the officer's number of arrests $\varepsilon$=the officer residual=the number of uses of force that the officer has more or less than the average, holding all other variables constant A variation on the second-order residual is to use a first-order residual in addition to or in place of the aggregate. For example, the second order residual for use of force could determine whether the officer had more or fewer arrests than their peer group. This is similar to using an interaction term (e.g., Unit*Arrests), but without requiring all the additional variables that would increase the likelihood of model failure.

$$Y = \beta_0 + \mathbb{V}_{unit} + \mathbb{V}_{geo} + \mathbb{V}_{time} + \beta_{arrest\_residual} * Arrest\_residual + \varepsilon$$

c. N-Order Residuals

Additional residuals can be added to models. The approach of adding residuals to models can be applied from 1 to n levels where n is the total number of aggregate features. Thus, the system may control for prior-order residuals as well as any other features created by preprocessors. For example, a use of force residual may control for an arrest residual, a dispatch residual and traffic stop residual, as follows:

$$Y = \beta_0 + \mathbb{V}_{unit} + \mathbb{V}_{geo} + \mathbb{V}_{time} + \beta_{arrest\_residual} * \text{Arrest\_residual} + \beta_{dispatch\_residual} * \text{Dispatch\_residual} + \beta_{trafficstop\_residual} * \text{Trafficstop\_residual} + \varepsilon$$

d. Social Structure Features

Another feature that can be created is based on an officer's peer group and social patterns of behavior. For example, if an officer is partnered with another officer of the same or different race or gender, or if an officer is on the same shift as other officers with a higher rate of use of force, these features can be identified and used by the model.

e. Latent Class Features

Another feature that can be created relates to patterns of behavior. Various patterns of behavior can be grouped or classified. Then the group that an individual officer belongs in may be used as a feature or variable in the model. Examples of such patterns include a patterns showing excessive use of force (e.g., an active officer uses more force than other active officers), rule breaking (e.g., an active officer does not follow policy guidelines) and a high sick leave usage with a fluctuating pattern of activity (e.g., the number of arrests increases or decreases before or after the leave).

f. Preprocessor (Other Features)

The system is built in a way that it can have an unlimited number of features and can be simple or complex. For each model or agency, a list of feature definitions is provided. The list can be of theoretically infinite length, as the preprocessor will continue calculating all of the features until the list has been completed. Each of the calculations will be provided as an option to the machine learning model. The preprocessor identifies a list of features and then calculates the value for each person at each aggregation.

Machine Learning

Figure 4:
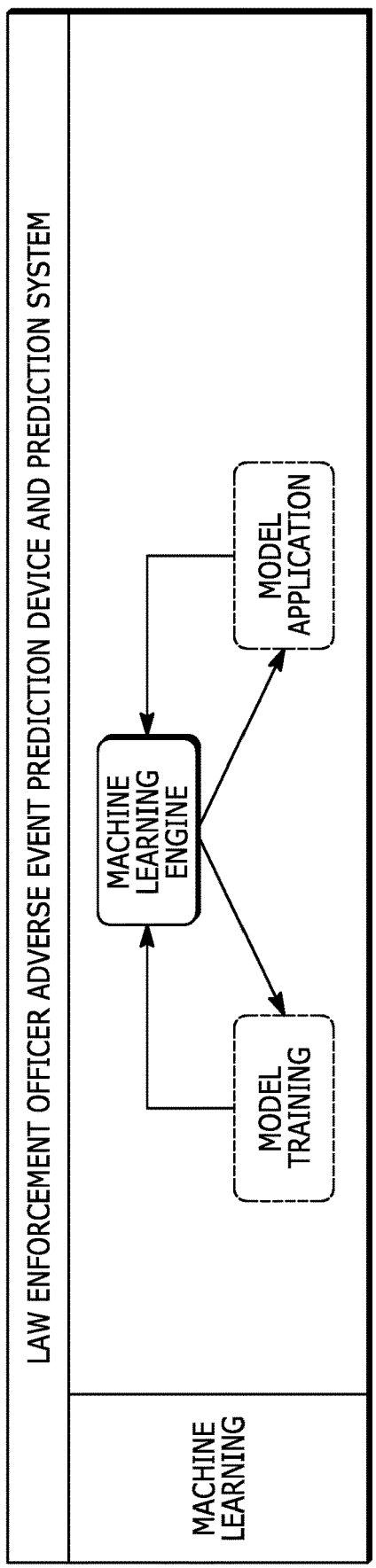
FIG. 4 is a flowchart for implementing an exemplary method for using machine learning to determine model and apply the model to generate a risk score.

FIG. 4 is a flow diagram showing how a machine learning engine may be used to create a model using the features and then apply the model to the data to generate a risk score.

a. Model Training—Create Model

A machine learning engine will create a model to predict the risk of an adverse event and provide a risk score based on some or all of the available features. The machine learning engine looks at features relating to past behavior for some period going back (e.g., 2 years) and creates several models to see which features or characteristics are most associated with an adverse incident. In other words, it performs various iterations of modeling based on historical data, and determines or identifies which iteration most accurately would have predicted an adverse event in the past. The best iteration is then used as the model. The model is saved and used to predict incident going forward.

For example, if one model turns out to be accurate 32% of the time and another is accurate 30% of the time, the model with the higher correlation is saved and selected.

b. Model Application—Generate a Risk Score

After a model is identified as the one to be used, the model is applied to data, over a certain time period, for an officer. For example, if the model requires use of residuals relating to number of arrests, time of day an officer works and the number of uses of force, that information is collected for the officer over the desired time period, e.g., past 2 years, and then modeled to generate a risk score.

The risk score can be provided as a number with a scale, for example, the score may range from 1 to 5, with 1 being the lowest risk and 5 being the highest risk, and a risk score of above 3 may be considered high enough to warrant preventative action or intervention. Other scales and cut-offs can be used as well. The score may also simply be provided as a level of risk, for example, low, medium or high. The score can also be provided in a range or with a description that indicates that an officer is doing well, as opposed to simply indicating the level of risk alone.

The information to be used by the model will be determined by what model is identified as being the best and information that model uses, but may include any of the aggregate data, preprocessed residuals (first-order, second-order or n-order), social structure residuals and latent class residuals.

Post-Processing—Risk Revising

Figure 5:
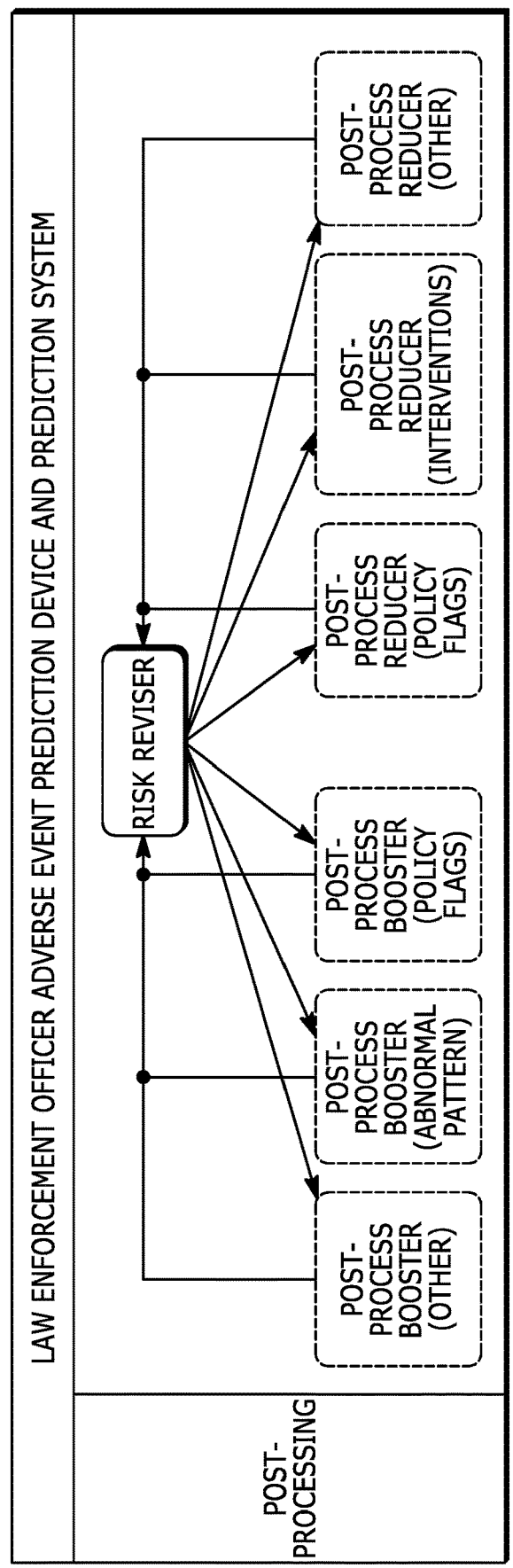
FIG. 5 is a flowchart for implementing an exemplary method for pos-processing to revise the risk score.

After the machine learning engine applies the model to determine a risk score, the system may evaluate other factors to revise the risk score for an officer. FIG. 5 is a flow diagram showing how a risk reviser engine may be used to revise the risk score. Similar to the pre-processing stage, the post-processing stage can handle a quantitatively large number of steps (only limited by the time/processing power it takes to perform calculations and the desired time frame for implementation).

a. Post-processing Risk Reduction

A number of factors may be used to reduce the risk score determined by the model. Examples of information that can be used to reduce the risk score include policy flags such as a policy has recently changed and whether an intervention or training that has recently taken place for the officer. This type of information is information that potentially may not be collected from the various sources and therefore needs to be considered separately.

b. Post-processing Risk Boosting

Similarly, a number of factors may be used to boost or increase the risk score determined by the model. Examples of information that can be used to increase the risk score include other policy flags such as whether an abnormal pattern of behavior for the officer has been detected or observed. Again, this type of information is information that potentially may not be collected from the various sources and therefore needs to be considered separately.

Display Information Relating to Risk Score

Figure 6:
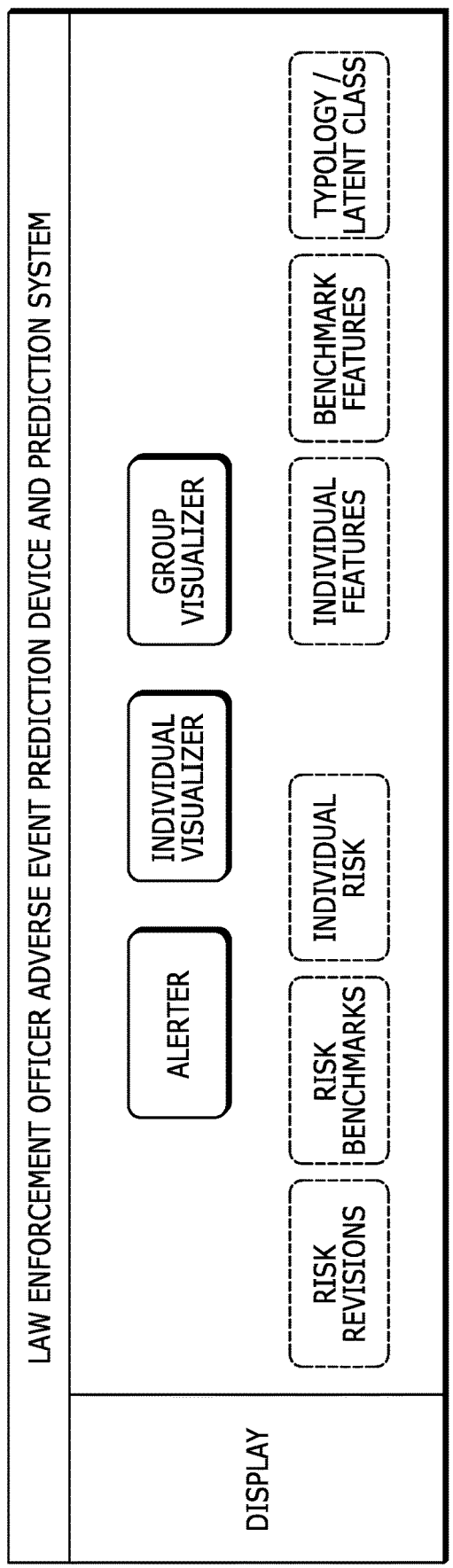
FIG. 6 is a flowchart for implementing an exemplary method for displaying information relating to a risk score.

FIG. 6 is a flow diagram showing how a machine learning engine may be used to display information relating to an officer's risk score.

An individual visualizer module may display an overall summary of the officer's risk, a typology of their risk profile, possible interventions available for correcting off-track behavior, aggregate counts and statistics regarding each type of officer activity that occurred over a time period.

A group visualizer module may display percentages of officers that are at risk, aggregate counts across officers for each type of activity logged, and diagrams allowing comparison and ranking of each individual officer within that group to the other officers of the group.

An alerter module may display the set of officers that need action/intervention due to their risk level.

Information displayed by these modules may be linked to other information that can be displayed by clicking on it. For example, information displayed by the modules may display or link to an individual's risk score, the risk benchmark and show what risk revisions were made to the modeled risk score. They may also display or link to an individual officer's features, the benchmark or average features and the typology or latent class of the officer.

Figures 1, 7:
Figures 2, 7:
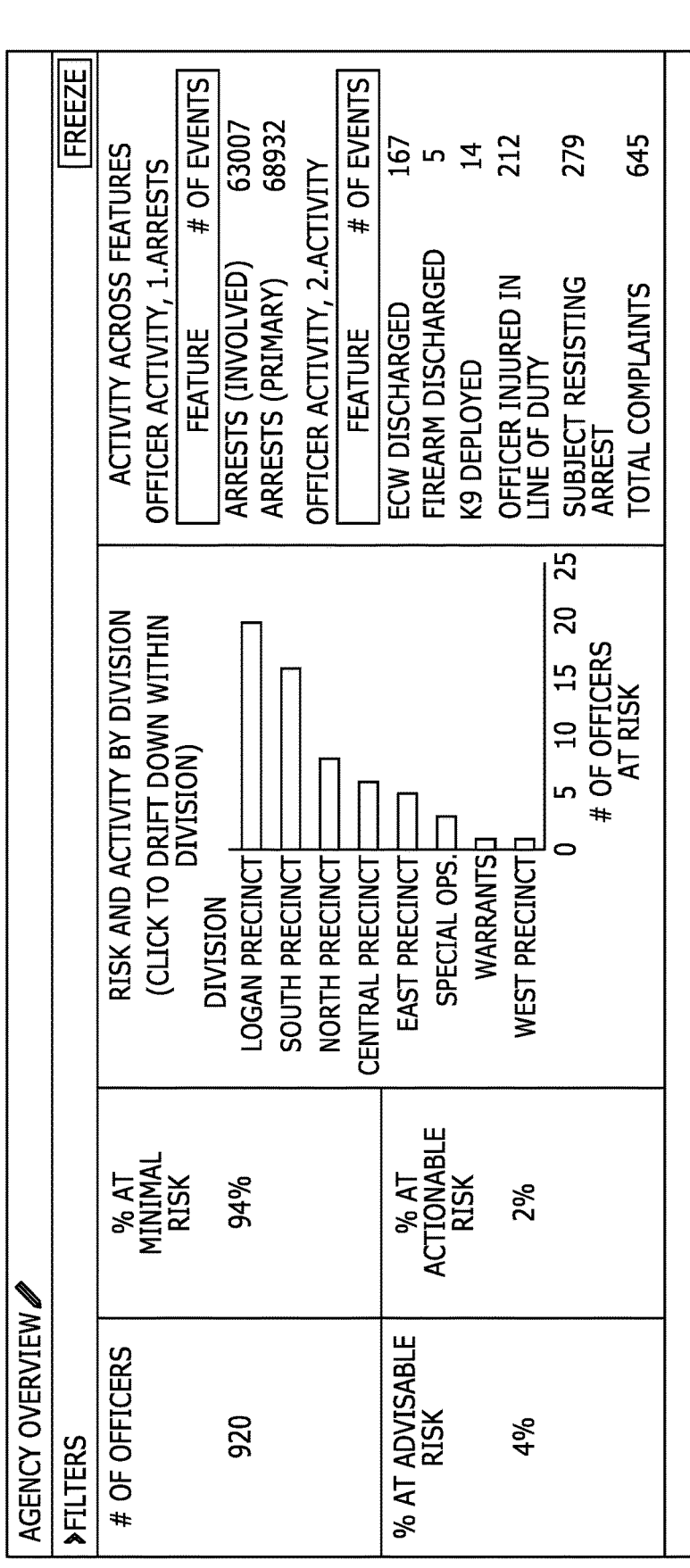
Figures 2, 7:
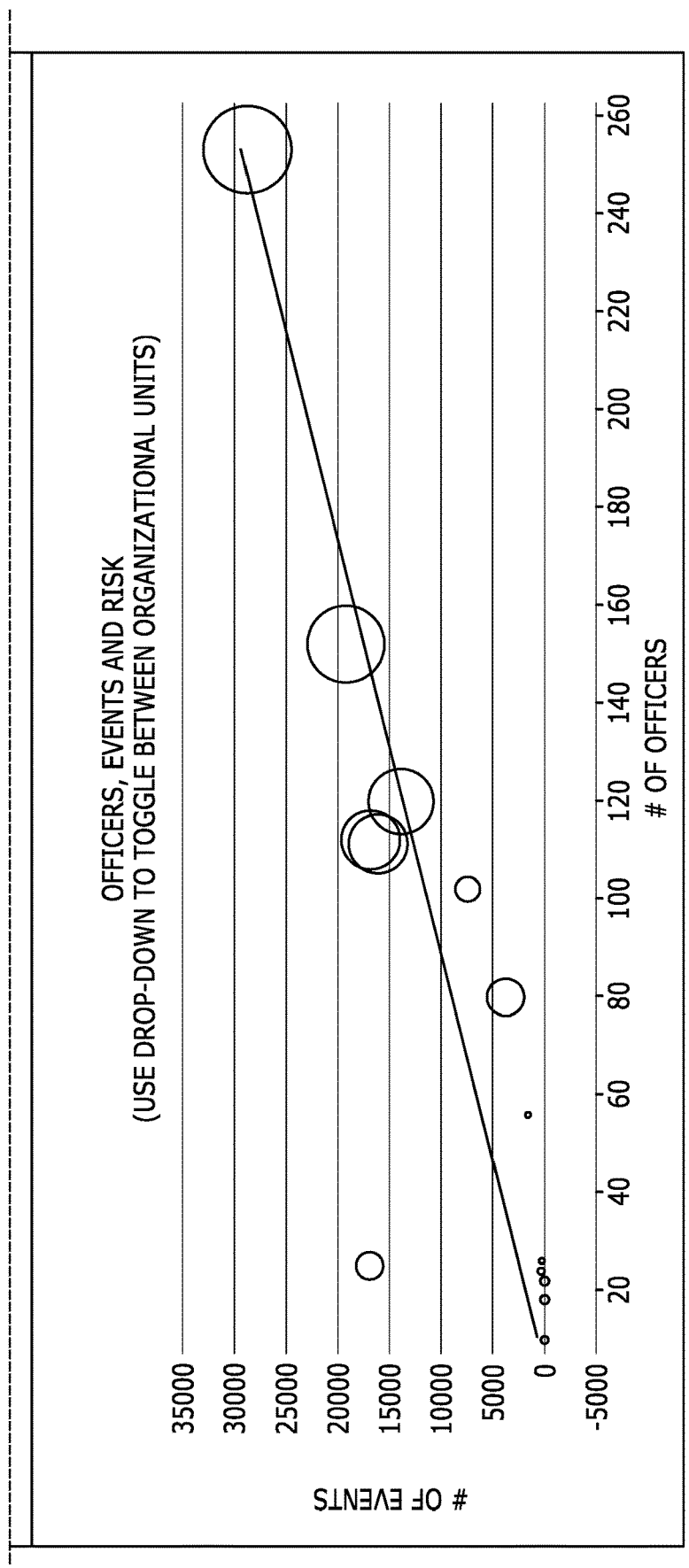

FIGS. 7-1 and 7-2 show various examples of the information that can be displayed.

Hardware and Software Overview

Figure 8:
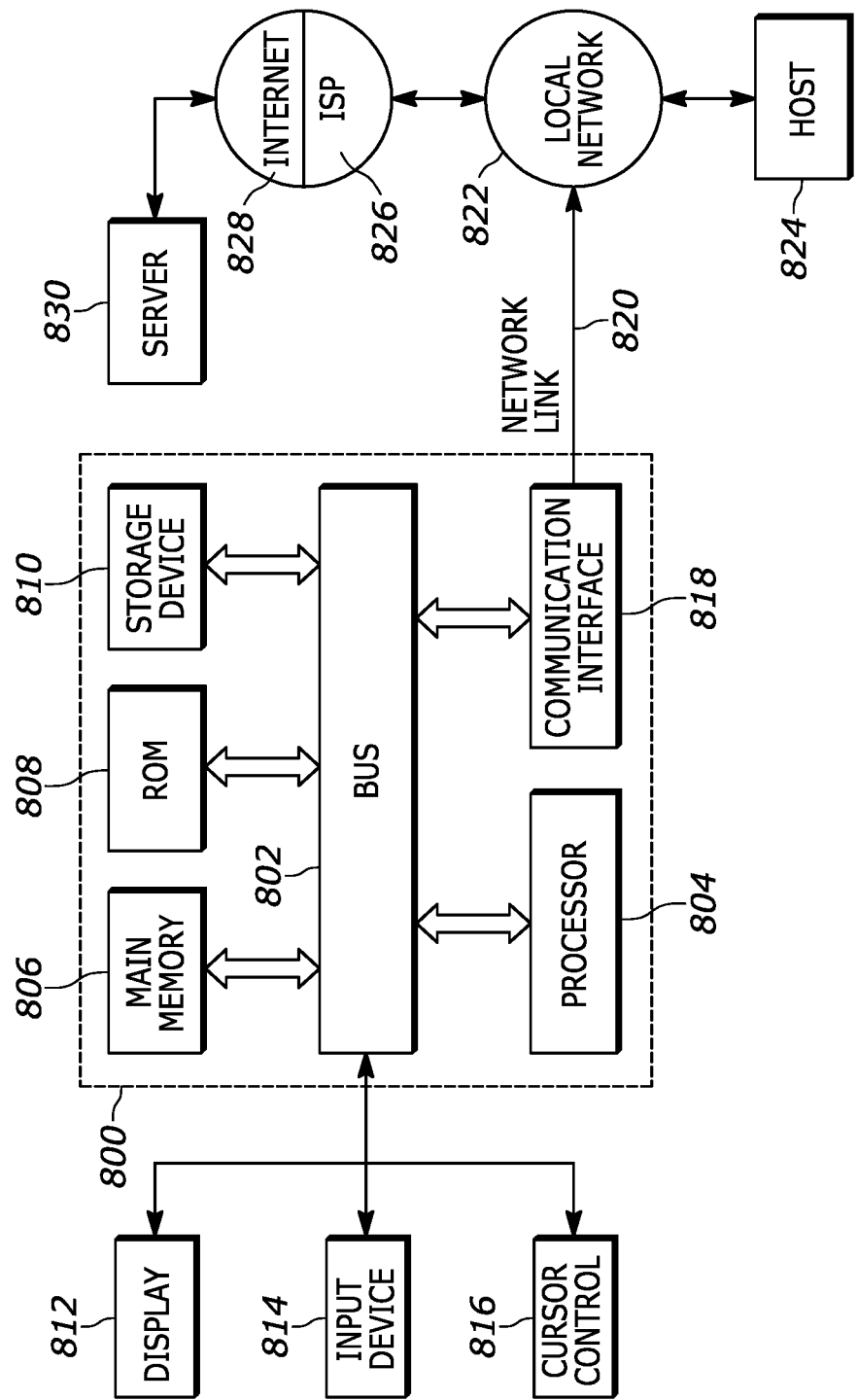
FIG. 8 is a schematic diagram of a computer system that can be used to implement an embodiment of the present invention.

In certain embodiments, execution of one or more steps in FIGS. 1-6 may be automated on a computer system, which can be, for example, a mainframe computer, minicomputer, workstation, personal computer, a web server, a thin client, and an Internet appliance. FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

One embodiment of the invention is related to the use of computer system 800 for trading. According to one embodiment of the invention, trading is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media include, for example, optical or magnetic disks, such as storage device 810. Volatile media include dynamic memory, such as main memory 806. Transmission media include coaxial cables, copper wire and fiber optics, including the wires that comprise bus 802. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network, now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820, and communication interface 818. In the Internet example, a server 430 might transmit a requested code for an application program through Internet 828, ISP 826, local network 822 and communication interface 818. In accordance with the invention, one such downloaded application provides for trading as described herein. The received code may be executed by processor 804 as it is received, and/or stored in storage device 810, or other non-volatile storage for later execution. In this manner, computer system 800 may obtain application code in the form of a carrier wave.

Accordingly, a system, method, software, and variables for identifying a police officer who may be at risk for involvement in an adverse event are described. More specifically, techniques are disclosed, wherein a system can construct variables by preprocessing data, classify patterns of behavior and identify other social structure features that are important in accurately determining an officer's risk of having an adverse event.

The invention claimed is:

1. A machine-learning based system configured to generate a risk score that predicts whether an officer is at risk of involvement in an adverse event, comprising:
   a preprocessing module for collecting and storing historical data about a plurality of characteristics and events relating to a plurality of police officers and creating and storing a first-level residual feature ε=representing the number of arrests that the officer has more or less than the average that the officer's department holding all other variables constant, based on the historical data as follows:

$$Y = \beta_0 + \mathbb{V}_{unit} + \mathbb{V}_{geo} + \mathbb{V}_{time} + \varepsilon$$

where:
   Y=the number of arrests that have occurred in a certain time period for the officer
   $\beta_0$=the average number of arrests for the officer's department $$\mathbb{V}_{unit} = \sum_{unit_i=0}^{u} \beta_{unit_i} * Unit_i = \text{A vector of coefficients that represent units the}$$

plurality of police officers work in and whether an individual officer works in that unit (the coefficient is the difference between that unit's number of arrests and the average, holding all else constant)

$$\mathbb{V}_{geo} = \sum_{geo_i=0}^{g} \beta_{geo_i} * Geo_i = \text{A vector of coefficients that represent}$$

the geographies the plurality of police officers are deployed to and whether the individual police officer works in that individual geography(the coefficient is the difference between that geography's number of arrests and the average, holding all else constant)

$$\mathbb{V}_{time} = \sum_{time_i=0}^{t} \beta_{time_i} * Time_i = \text{A vector of coefficients that represent the time-}$$

periods during the day when an the individual police officer is deployed and whether an individual officer works in that time period(the coefficient is the difference between that time-period's number of arrests and the average, holding all else constant)

ε=the officer's residual=The number of arrests that the individual officer has more or less than the average, holding all other variables constant;
   a machine learning module for accessing the stored first-level residual feature and: (a) constructing and storing a plurality of models that predict the risk of an adverse event and generating a risk score, each of the models including the first-level residual feature, (b) running each of the models, with the machine learning module, using the collected, historical data, (c) identifying which one of the plurality of models would have best predicted an adverse event in the past and (d) saving the identified model for use by the system to predict an adverse incident in the future; and,
   a model application module for running the identified model using data about the officer and generating: (a) a risk score for the officer and (b) other information relating to the risk score, and for outputting the risk score and the other information relating to the risk score from the model application module to a display for displaying the risk score and information relating to the officer's risk score.

2. The machine-learning based system of claim 1 further including:
   a risk-revising module for revising the officer's risk score based on data other than data used to determine the initial risk score.

3. The machine-learning based system of claim 1 further including:
   an alerter module for displaying possible interventions to be taken for the officer based on the officer's risk score.

4. The machine-learning based system of claim 1 further wherein the other information relating to the risk score displayed by the displayed includes one or more of an overall summary of the officer's risk, a typology of the officer's risk profile, possible interventions for correcting an officer's behavior based on the risk score and level of risk.

5. The machine-learning based system of claim 1 wherein the data to which the model is applied includes one or more of: aggregate data, the preprocessed first-level residual feature, social structure residuals and latent class residuals.

6. The machine-learning based system of claim 1 wherein:
   the preprocessing module is also for creating and storing a second-level residual feature, based on the first-level residual feature, as follows:

$$Y = \beta_0 + \mathbb{V}_{unit} + \mathbb{V}_{geo} + \mathbb{V}_{time} + \beta_{arrests} * \text{Arrests} + \varepsilon$$

where:
   Y=the number of uses of force for an officer
   $\beta_0$=the average number of uses of force for the department
   $\beta_{arrests}$=the average amount that each arrest increases use of force, holding all else constant
   Arrests=the officer's number of arrests
   ε=the officer residual feature=the number of uses of force that the officer has more or less than the average, holding all other variables constant
   and the machine level module is also for constructing and storing a plurality of models that predict the risk of an adverse event and generating a risk score, each of the models including the second-level residual feature.

7. The machine-learning based system of claim 6 wherein the data to which the model is applied includes one or more of: aggregate data, the preprocessed second-level residual feature, social structure residuals and latent class residuals.

8. A computer-implemented method for determining a risk score reflecting the risk that a police officer may be involved in an adverse event in the future, comprising:
   preprocessing, with a preprocessing module, collected, historical data about a plurality of characteristics and events relating to a plurality of police officers to create a first-level residual feature ε=representing the number of arrests that the officer has more or less than the average, holding all other variables constant, as follows:

$$Y = \beta_0 + \mathbb{V}_{unit} + \mathbb{V}_{geo} + \mathbb{V}_{time} + \varepsilon$$

where:
   Y=the number of arrests that have occurred in a certain time period for the officer $\beta_0$=the average number of arrests for the officer's department $$\mathbb{V}_{unit} = \sum_{unit_i=0}^{u} \beta_{unit_i} * Unit_i = \text{A vector of coefficients that represent units the}$$

plurality of police officers work in and whether the individual officer works in that unit (the coefficient is the difference between that unit's number of arrests and the average, holding all else constant)

$$\mathbb{V}_{geo} = \sum_{geo_i=0}^{g} \beta_{geo_i} * Geo_i = \text{A vector of coefficients that represent}$$

the geographies the plurality of police officers are deployed to and whether the individual police officer works in that individual geography(the coefficient is the difference between that geography's number of arrests and the average, holding all else constant)

$$\mathbb{V}_{time} = \sum_{time_i=0}^{t} \beta_{time_i} * Time_i = \text{A vector of coefficients that represent the time-}$$

periods during the day when an individual police officer is deployed and whether the individual officer works in that time period(the coefficient is the difference between that time-period's number of arrests and the average, holding all else constant)

$\epsilon$=the officer's residual=The number of arrests that the individual officer has more or less than the average, holding all other variables constant;

constructing and storing, with a machine learning module, a plurality of models that predict the risk of an adverse event and generate a risk score, each of the models including the first-level residual feature $\epsilon$;

running each of the models, with the machine learning module, using the collected, historical data and for identifying which one of the plurality of models would have best predicted an adverse event in the past and saving the identified model for use by the system to predict an adverse incident in the future; and, running the identified model, with a model application module, using data about a plurality of characteristics and events collected about the officer and generating with the model application module a risk score for the officer and other information relating to the risk score, the risk score indicating a level of risk that a police officer may be involved in an adverse event in the future;

outputting the risk score and the other information relating to the risk score from the model application module to a display and displaying, on the display, the risk score and information relating to the officer's risk score.

9. The computer-implemented method of claim 8 wherein:

the information relating to the risk score of an officer includes one or more of an overall summary of the officer's risk, a typology of the officer's risk profile, possible interventions for correcting an officer's behavior based on the risk score and level of risk.

10. The computer-implemented method of claim 8 further comprising the step of:

revising the officer's risk score, with a risk reviser module, based on data other than the collected historical data used by the models.

11. The computer-implemented method of claim 8 wherein, outputting the revised risk score from the risk reviser module to the display and displaying, on the display, the revised risk score.

12. The computer-implemented method of claim 8 wherein the data to which the model is applied includes one or more of: aggregate data, the preprocessed first-level residual feature, social structure residuals and latent class residuals.

13. The computer-implemented method of claim 8 wherein:

the preprocessing step also includes creating and storing a second-level residual feature, based on the first-level residual feature, as follows:

$$Y = \beta_0 + \mathbb{V}_{unit} + \mathbb{V}_{geo} + \mathbb{V}_{time} + \beta_{arrests} * \text{Arrests} + \epsilon$$

where:

Y=the number of uses of force for an officer $\beta_0$=the average number of uses of force for the department $\beta_{arrests}$=the average amount that each arrest increases use of force, holding all else constant Arrests=the officer's number of arrests $\epsilon$=the officer residual=the number of uses of force that the officer has more or less than the average, holding all other variables constant and the constructing and storing, with a machine learning module, a plurality of models includes constructing and storing a plurality of models that predict the risk of an adverse event and generating a risk score, each of the models including the second-level residual feature.

14. The computer-implemented method of claim 13 wherein the data to which the model is applied includes one or more of: aggregate data, the preprocessed second-level residual feature, social structure residuals and latent class residuals.

15. The computer-implemented method of claim 8 further including the step of:

creating an alert which displays possible interventions to be taken for the officer based on the officer's risk score.

* * * * *